United States Patent
Choi et al.

(10) Patent No.: US 9,214,971 B2
(45) Date of Patent: Dec. 15, 2015

(54) APPARATUS AND METHOD FOR EVALUATING STATISTICAL INTERFERENCE CONCERNING MULTI-SOURCE NOISE ENVIRONMENT OF ELECTROMAGNETIC ZONE

(71) Applicant: Electronics and Telecommunications Research Institute, Daejeon (KR)

(72) Inventors: Su Na Choi, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 13/911,501

(22) Filed: Jun. 6, 2013

(65) Prior Publication Data

US 2014/0148113 A1    May 29, 2014

(30) Foreign Application Priority Data

Nov. 26, 2012  (KR) .................. 10-2012-0134263

(51) Int. Cl.
*H04B 17/00* (2015.01)
*H04B 1/10* (2006.01)

(52) U.S. Cl.
CPC .................................. *H04B 1/1027* (2013.01)

(58) Field of Classification Search
CPC ...... H04B 1/1027; H04B 17/20; G01R 23/16; H04W 16/14; H04W 24/06; H04W 72/082
USPC ............... 455/67.11, 67.13, 115.1, 226.1; 324/76.13, 76.15, 76.11
See application file for complete search history.

(56) References Cited

U.S. PATENT DOCUMENTS

| 6,509,728 B1 * | 1/2003 | Uchino et al. ............. 324/76.15 |
| 8,599,748 B2 * | 12/2013 | Stamoulis et al. ............ 370/328 |
| 8,768,260 B2 * | 7/2014 | Tsukamoto et al. ....... 455/67.11 |
| 2010/0075704 A1 * | 3/2010 | McHenry et al. ............. 455/509 |

OTHER PUBLICATIONS

Wiklundh, Kia, "A Method to Determine the Impact from Disturbing Electrical Equipment on Digital Communication System by using APD," Report No. R008/2003, Department of Signals and Systems, Chalmers University of Technology, 14 pages, (2003).

* cited by examiner

*Primary Examiner* — Sonny Trinh

(74) *Attorney, Agent, or Firm* — Nelson Mullins Riley & Scarborough LLP; Anthony A. Laurentano, Esq.; Michael Malone, Esq.

(57) ABSTRACT

An apparatus and method for evaluating statistical interference concerning a multi-source noise environment of an electromagnetic (EM) zone are disclosed. The apparatus for evaluating statistical interference may include a receiver to receive an EM wave in a preset frequency band, a spectrum analyzer to analyze the received EM wave and to measure interference in the preset frequency band, a frequency selector to select an interest frequency in the frequency band based on a level of the measured interference, an amplitude probability distribution (APD) measurement unit to measure an APD of an interference signal with respect to the interest frequency, and a comparator to compare the measured APD to a preset limit and to draw a probability of the limit or higher of interference occurring.

16 Claims, 5 Drawing Sheets

APPARATUS AND METHOD FOR EVALUATING STATISTICAL INTERFERENCE CONCERNING MULTI-SOURCE NOISE ENVIRONMENT OF ELECTROMAGNETIC ZONE

CROSS-REFERENCE TO RELATED APPLICATION

This application claims the priority benefit of Korean Patent Application No. 10-2012-0134263, filed on Nov. 26, 2012, in the Korean Intellectual Property Office, the disclosure of which is incorporated herein by reference.

BACKGROUND

1. Field of the Invention

The present invention relates to an apparatus and method for evaluating statistical interference concerning a multi-source noise environment of an electromagnetic (EM) zone which evaluates statistical interference in a frequency band for evaluation considering multi-source noise environment of an EM zone.

2. Description of the Related Art

An electromagnetic (EM) compatibility test on electronic and communication equipment is conducted in an environmental noise-proof anechoic chamber by measuring a level of noise generated from electronic or communication equipment and determining whether the measured noise level exceeds a limit.

However, in actuality, electronic and communication devices are used in an environment where varied forms of EM noise are present. Thus, such devices are likely to cause more interference in other wireless devices due to noise produced by such devices in combination with a multi-source noise.

EM noise may be divided into white Gaussian noise (WGN), impulsive noise (IN), and single carrier noise (SCN). Among the preceding, SCN is a form of interference noise detected from a nearby noise source. In addition to SCN, multi-source environment noise may include EM noise, such as WGN and IN, generated by naturally occurring noise and overall man-made noise. The multi-source environment noise may change in localities over time, wherein a region defined as the same EM wave environment may be expressed as an EM zone. Transitively, a statistical interference evaluation method is needed to evaluate an impact of multi-source noise in such an EM zone.

SUMMARY

An aspect of the present invention provides an apparatus and a method for evaluating statistical interference concerning a multi-source noise environment of an electromagnetic (EM) zone which are capable of evaluating an impact of multi-source noise in an EM zone.

Another aspect of the present invention also provides an apparatus and a method for evaluating statistical interference concerning a multi-source noise environment of an EM zone which are capable of effectively analyzing and evaluating an impact of multi-source noise in an EM zone.

According to an aspect of the present invention, there is provided an apparatus for evaluating statistical interference, the apparatus including a receiver to receive an EM wave in a preset frequency band, a spectrum analyzer to analyze the received EM wave and to measure interference in the preset frequency band, a frequency selector to select an interest frequency in the frequency band based on a level of the measured interference, an amplitude probability distribution (APD) measurement unit to measure an APD of an interference signal with respect to the interest frequency, and a comparator to compare the measured APD to a preset limit and to determine a probability of the limit of interference or higher occurring.

The spectrum analyzer may select a resolution bandwidth for the preset frequency band based on a resolution bandwidth table in which a resolution bandwidth is set for each frequency band.

The interest frequency may be a peak frequency or a particular frequency of a device subject to interference in the frequency band.

The apparatus may further include a limit calculation unit to calculate the limit based on an interference evaluation model in consideration of a multi-source noise environment of a region defined as the same EM wave environment.

The limit calculation unit may generate the interference evaluation model by correcting a field intensity of interference allowable by a device subject to interference due to a target device of interference evaluation to a field intensity of a measurement device to measure an impact of interference by the target device of interference evaluation and calculate the limit based on the generated interference evaluation model.

The limit calculation unit may generate the interference evaluation model by correcting a difference between the device subject to the interference and the measurement device in consideration of an attenuation effect based on a distance between the device subject to the interference and the measurement device and the multi-source noise environment of the region defined as the same EM wave environment.

According to an aspect of the present invention, there is provided an apparatus for evaluating statistical interference, the apparatus including a frequency selector to select an interest frequency in a preset frequency band based on a level of interference measured in the entire preset frequency band, an APD measurement unit to measure an APD of an interference signal with the interest frequency, and a comparator to compare the measured APD to a preset limit and to draw a probability of the limit of interference or higher occurring.

According to an aspect of the present invention, there is provided a device for calculating a limit, the device including an input unit to receive an input of a field intensity of interference allowable by a device subject to interference due to a target device of interference evaluation, a correction unit to correct the field intensity to a field intensity of a measurement device to measure an impact of interference by the target device of interference evaluation, and a calculation unit to calculate a limit for determining a probability of interference occurring based on the corrected field intensity.

According to an aspect of the present invention, there is provided a method for evaluating statistical interference carried out by an interference evaluation apparatus in consideration of a multi-source noise environment, the method including setting a frequency band for interference evaluation, measuring interference in the set frequency band, selecting an interest frequency in the frequency band based on a level of the measured interference, measuring an APD of an interference signal with respect to the interest frequency, and comparing the measured APD to a preset limit and determining a probability of the limit of interference or higher occurring.

According to an aspect of the present invention, there is provided a method for calculating a limit carried out by a limit calculation device for statistical interference evaluation in consideration of a multi-source noise environment, the method including receiving an input of a field intensity of interference allowable by a device subject to interference due to a target device of interference evaluation, correcting the field intensity to a field intensity of a measurement device to measure an impact of interference by the target device of interference evaluation, and calculating a limit for drawing a probability of interference occurring based on the corrected field intensity.

As described above, according to exemplary embodiments of the present invention, an interest frequency is selected based on a level of interference measured in a preset frequency band, an APD of an interference signal with the interest frequency is measured, and the APD is compared to a preset limit, thereby effectively analyzing and evaluating an impact of interference in an environment.

Further, since a limit of comparison to an APD is calculated based on an interference evaluation model in consideration of a multi-source noise environment of a region defined as the same EM wave environment, an impact of interference in an environment may be effectively analyzed and evaluated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments of the present invention will be described in detail with reference to the accompanying drawings.

Figure 1:
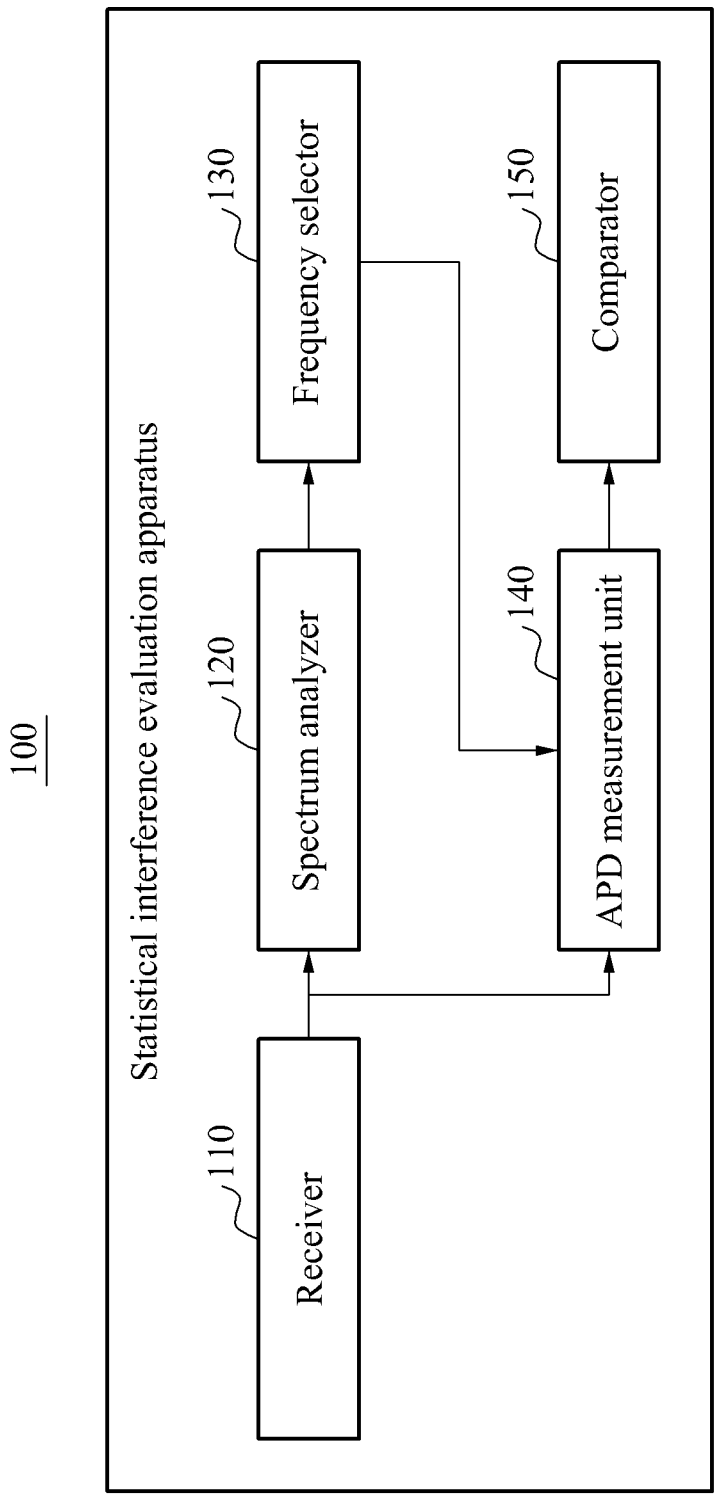
FIG. 1 is a block diagram illustrating an apparatus for evaluating statistical interference concerning a multi-source noise environment of an electromagnetic (EM) zone according to an exemplary embodiment of the present invention.

FIG. 1 is a block diagram illustrating an apparatus 100 for evaluating statistical interference concerning a multi-source noise environment of an electromagnetic (EM) zone according to an exemplary embodiment of the present invention.

The apparatus 100 for evaluating statistical interference concerning the multi-source noise environment (also referred to as a "statistical interference evaluation apparatus 100") may include a receiver 110, a spectrum analyzer 120, a frequency selector 130, an amplitude probability distribution (APD) measurement unit 140, and a comparator 150.

First, when a frequency band for evaluation and measurement conditions is set, the receiver 110 receives an EM wave in the set frequency band. To this end, the receiver 110 may be configured, for example, as an antenna.

The spectrum analyzer 120 analyzes a spectrum of the EM wave received by the receiver 110 and measures interference in the frequency band. For example, the spectrum analyzer 120 may measure the interference in the frequency band based on an EM interference measurement method, for example, peak detection and quasi-peak detection. Here, for accurate interference measurement, the spectrum analyzer 120 may select a proper resolution bandwidth (RBW) for the set frequency band based on an RBW table by a frequency band illustrated in Table 1. The spectrum analyzer 120 may include the receiver 110, as necessary.

TABLE 1

| Frequency band (Hz) | 150k or lower | 150k-30M | 30M-1G | 1G or higher |
|---|---|---|---|---|
| RBW (Hz) | 200 | 9k | 100k | 1M |

The frequency selector 130 selects a peak frequency having a high level of interference or a particular frequency of a device subject to interference as an interest frequency based on a measurement by the spectrum analyzer 120. When a level of the interference measured in the entire preset frequency band is input through a reception device and a spectrum analyzer separate from the statistical interference evaluation apparatus 100, the frequency selector 130 may select an interest frequency based on the input measurement.

The APD measurement unit 140 measures an APD of an interference signal with each interference frequency selected by the frequency selector 130. The APD indicates a probability of a particular level of interference or higher occurring, which may be represented by Equation 1:

$$APD(x) = Prob(X > x) \quad \text{[Equation 1]}$$
$$= 1 - Prob(X \leq x)$$
$$= 1 - F(x)$$

The comparator 150 compares the APD measured by the APD measurement unit 140 to a preset limit $E_{limit}$, thereby drawing a possibility of the limit of interference or higher occurring. The limit $E_{limit}$ may be a value set in a device, or be obtained through an interference evaluation model concerning a multi-source noise environment in consideration of a multi-source noise in an actual environment.

To this end, the statistical interference evaluation apparatus 100 may further include a limit calculation unit to calculate the limit $E_{limit}$ based on the interference evaluation model concerning the multi-source noise environment of the EM zone.

Figure 2:
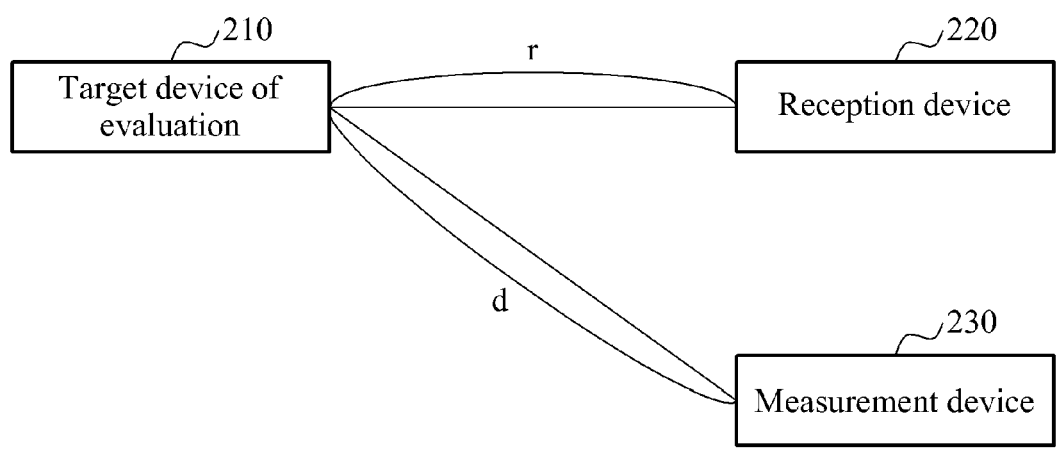
FIG. 2 is a diagram illustrating relationships between a target device of evaluation, a reception device, and a measurement device according to an exemplary embodiment of the present invention.

FIG. 2 is a diagram illustrating relationships between a target device 210 of evaluation, a reception device 220, and a measurement device 230 according to an exemplary embodiment of the present invention. Hereinafter, a process that the limit calculation unit calculates the limit $E_{limit}$ for interference evaluation concerning a multi-source noise environment of an EM zone will be described with reference to FIG. 2.

FIG. 2 illustrates the target device 210 of evaluation to be evaluated as to an impact of interference and the reception device 220 subject to interference by the target device 210 of evaluation. When a field intensity of a signal to be received by the reception device 220 is $e_w$, a field intensity of interference allowable by the reception device 220 is $e_i$, and a minimum signal to noise ratio (SNR) of the reception device 220 to ensure quality of a signal is $r_p$, the field intensity of interference $e_i$, allowable by the reception device 220 may be represented by Equation 2:

$$e_{ir} = \frac{e_w}{r_p}. \quad \text{[Equation 2]}$$

However, actual impact of interference is measured by the measurement device 230. Thus, when interference measured by the measurement device 230 is $e_i$, $e_i$ may be represented by Equation 3 by correcting a difference between the measurement device 230 and the reception device 220:

$$e_i = e_{ir} \cdot m_{ir} \cdot l_0 \cdot l_b \quad \text{[Equation 3]}$$

$m_{ir}$ is a value for correction of polarization of measurement antennas of the reception device 220 and the measurement device 230, and $l_0$ is a value representing an attenuation effect based on a distance between the reception device 220 and the measurement device 230.

When a distance from the target device 210 of evaluation to be evaluated as to an impact of interference by the measurement device 230 is d and a distance from the target device 210 to the reception device 220 is r, an attenuation effect based on the distance between the reception device 220 and the measurement device 230 may be represented by $$l_0 = \left(\frac{r}{d}\right)^x.$$

Here, $l_b$ refers to an attenuation effect of an obstacle, and the like.

Here, considering an actual multi-source noise environment of the reception device 220, $e_i$ may be modified into $e_{mi}$, as represented by Equation 4:

$$e_{mi} = \sum_{i=1}^{n} e_i = \frac{e_w \cdot m_{ir} \cdot l_0 \cdot l_b}{r_p}. \quad \text{[Equation 4]}$$

Equation 4 may be represented by Equation 5 when being converted into a log scale:

$$E_{mI} = E_w + M_{ir} + L_0 + L_b - R_p \quad \text{[Equation 5]}$$

When each element of Equation 5 is a normal distribution function, the $E_{limit}$ of interference may be represented by equations with respect to an average u and a standard deviation σ of the elements, a probability α that an SNR R is greater than a minimum SNR $R_p$, and a probability β that a multi-source noise interference $E_{mi}$ is smaller than the limit $E_{limit}$ of interference, as shown in Equation 6:

$$E_{limit} = \mu_w + \mu m_{ir} + \mu_{L0} + \mu_{Lb} - R_p + \quad \text{[Equation 6]}$$

$$\frac{t_\beta \sigma_{mi} - t_\alpha \sqrt{\sigma_w^2 + \sigma_{mir}^2 + \sigma_{L0}^2 + \sigma_{Lb}^2 + \sigma_{mi}^2}}{}$$

$$\alpha = P(R > R_p) = F\left(\frac{-R_p + u_R}{\sigma_R}\right),$$

$$t_\alpha = F^{-1}(\alpha)$$

$$\beta = P(E_{mi} < E_{limit}) = F\left(\frac{E_{limit} - u_{mi}}{\sigma_{mi}}\right),$$

$$t_\beta = F^{-1}(\beta).$$

Here, $u_w$, $u_{mir}$, $u_{L0}$, $u_{Lb}$, $u_{Rp}$, $\sigma_w$, $\sigma_{mir}$, $e\sigma_{L0}$, and $e\sigma_{Lb}$ may be given or deduced based on conditions of a system, and multi-source noise may select a proper value to be applied to an environment through selecting a noise factor, for example, a season, a time, and a place. Medians $F_{mi}$ and $\sigma_{mi}$ by a multi-source noise environment are considered a half-normal distribution and applied as follows.

$$F_{mi} = c\left[\ln(a_T) - \frac{\sigma_T^2}{2c}\right], \quad \text{[Equation 7]}$$

$$\sigma_{mi} = c\sqrt{\ln\left(1 + \frac{b_T}{a_T^2}\right)}$$

$$a_T = \sum_{i=1}^{n} a_i = \sum_{i=1}^{n} \exp\left[\frac{F_i}{c} - \frac{\sigma_i^2}{2c^2}\right],$$

$$b_T = \sum_{i=1}^{n} a_i^2 \sqrt{\exp\left(\frac{\sigma_i^2}{c^2}\right) - 1},$$

$$c = 10/\ln(10).$$

Here, α and β are determined based on reliability.

Generally, a 80% product reliability, which means that 80% of products pass an interference reference, is a reference, in which $t_\alpha$ and $t_\beta$ may be set to 0.84 to determine the limit $E_{limit}$. To secure a higher reliability, the limit $E_{limit}$ may be adjusted based on $t_\alpha$ and $t_\beta$ in accordance with reliability as shown in Table 2.

TABLE 2

| Reliability | 80% | 85% | 90% | 95% |
|---|---|---|---|---|
| $t_\alpha$, $t_\beta$ | 0.84 | 1.035 | 1.28 | 1.645 |

The statistical interference evaluation apparatus according to the present invention may calculate a probability of a limit of interference or higher occurring, using the interference evaluation model calculated by Equation 6, thereby effectively analyzing and evaluating a probability of interference occurring in an actual environment.

Figure 3:
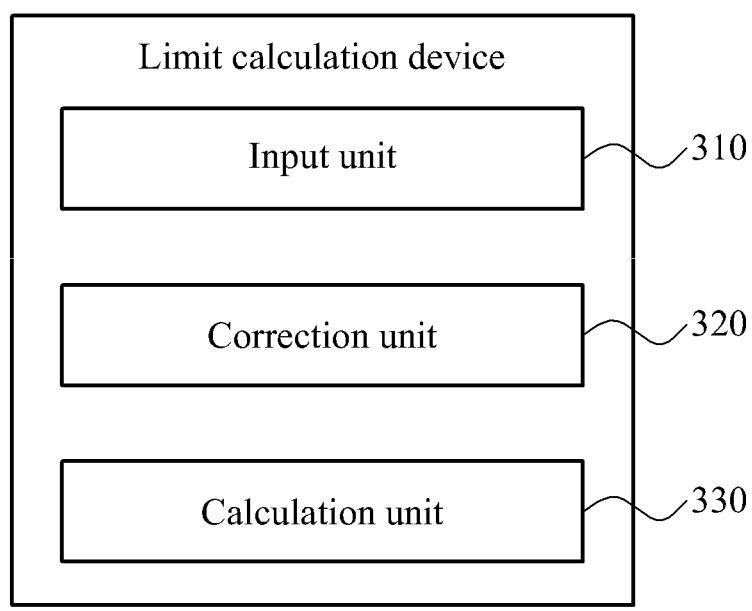
FIG. 3 is a block diagram illustrating a device of calculating a limit according to an exemplary embodiment of the present invention.

FIG. 3 is a block diagram illustrating a device of calculating a limit, also referred to as a "limit calculation device", according to an exemplary embodiment of the present invention. The limit calculation unit described above may be configured as a separate limit calculation device when necessary. Hereinafter, a configuration of the limit calculation device will be described with reference to FIG. 3.

The limit calculation device may include an input unit 310, a correction unit 320, and a calculation unit 330.

The input unit 310 receives an input of a field intensity of interference allowable by a device subject to interference by a target device of interference evaluation, as represented by Equation 2.

The correction unit 320 corrects the field intensity input by the input unit 310 to a field intensity of a measurement device to measure an impact of interference by the target device of interference evaluation. For example, the correction unit 320 may correct a field intensity of the measurement device of Equation 2 in consideration of an attenuation effect, based on a distance between the device subject to interference and the measurement device, an attenuation effect by an obstacle, and a polarization state of the measurement antenna, thereby calculating a corrected field intensity as shown in Equation 3. In addition, the correction unit 320 may correct the field intensity of Equation 3 in consideration of a difference between the device subject to interference and the measurement device concerning an obstacle and a multi-source noise environment of a region defined as the same EM wave environment as illustrated in Equation 4.

The calculation unit 330 calculates a limit for obtaining a probability of interference occurring based on the field intensity corrected by the correction unit 320. For example, the calculation unit 330 may convert the field intensity of Equation 4 corrected by the correction unit 320 into a log scale of Equation 5, generate an interference evaluation model of Equation 6 concerning a multi-source noise environment of a region defined as the same EM wave environment based on Equation 5, and calculate the limit based on the generated interference evaluation model.

Figure 4:
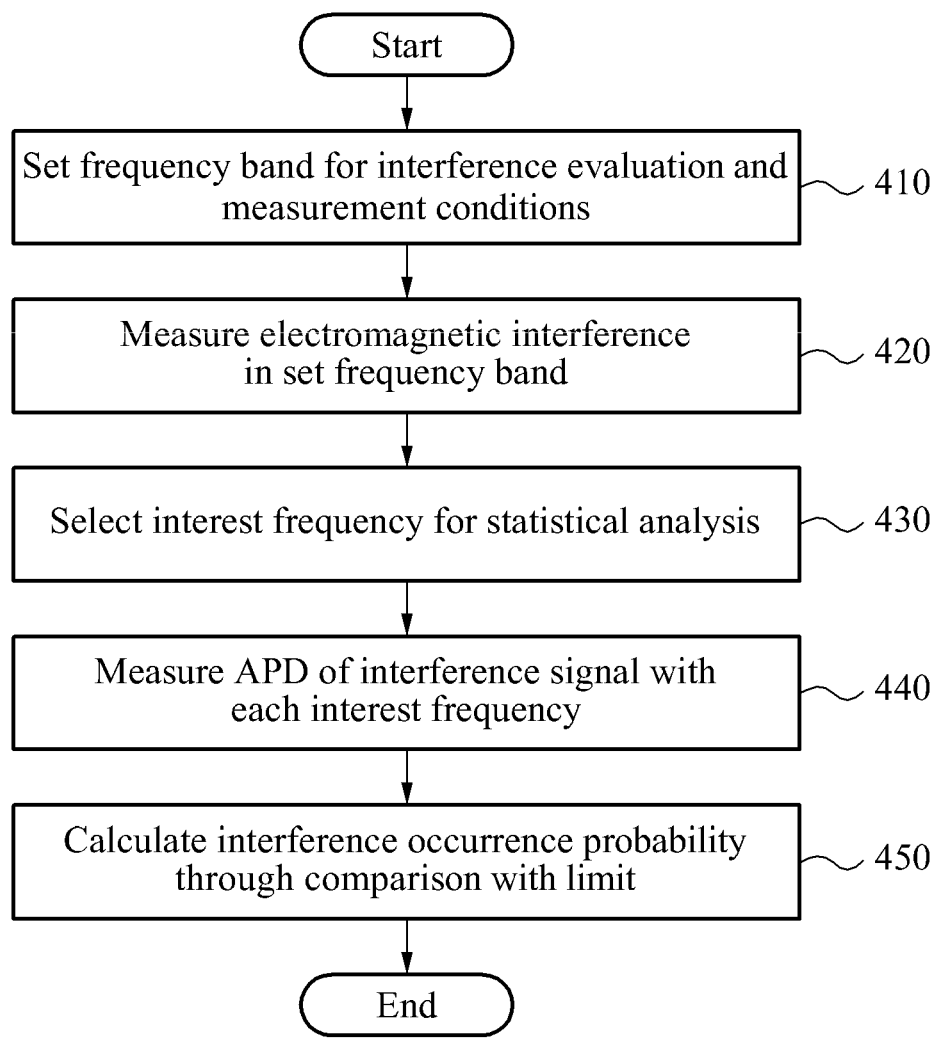
FIG. 4 is a flowchart illustrating a method for evaluating statistical interference concerning a multi-source noise environment of an EM zone according to an exemplary embodiment of the present invention.

FIG. 4 is a flowchart illustrating a method for evaluating statistical interference concerning a multi-source noise environment of an EM zone according to an exemplary embodiment of the present invention.

When a frequency band for interference evaluation and measurement conditions are set in operation 410, the statistical interference evaluation apparatus receives an EM wave in the set frequency band using an antenna and measures EM interference in the entire set frequency band using a spectrum analyzer based on a preset EM interference measurement method in operation 420. Here, the statistic interference evaluation apparatus may measure the EM interference, for example, peak detection and quasi-peak detection and select a proper resolution bandwidth (RBW) for the set frequency band based on an RBW table by frequency band illustrated in Table 1.

When the EM interference is measured, the statistic interference evaluation apparatus selects an interest frequency, for example, a peak frequency, for statistical analysis in the frequency band based on a level of the measured interference in operation 430 and measures APD of an interference signal with the selected interest frequency using Equation 1 in operation 440.

In operation 450, the measured APD is compared to a preset limit, thereby obtaining a probability of the limit of interference or higher occurring. Here, the limit may be obtained through an interference evaluation model concerning a multi-source noise environment of a region defined as the same EM wave environment. To this end, the statistic interference evaluation apparatus may correct a field intensity of interference allowable by a device subject to interference by a target device of interference evaluation to a field intensity of a measurement device to measure an impact of interference by the target device of interference evaluation, thereby generating the interference evaluation model. In this case, the interference evaluation model may be generated by correcting a difference between the device subject to the interference and the measurement device in consideration of an attenuation effect based on a distance between the device subject to the interference and the measurement device and the multi-source noise environment of the region defined as the same EM wave environment.

Figure 5:
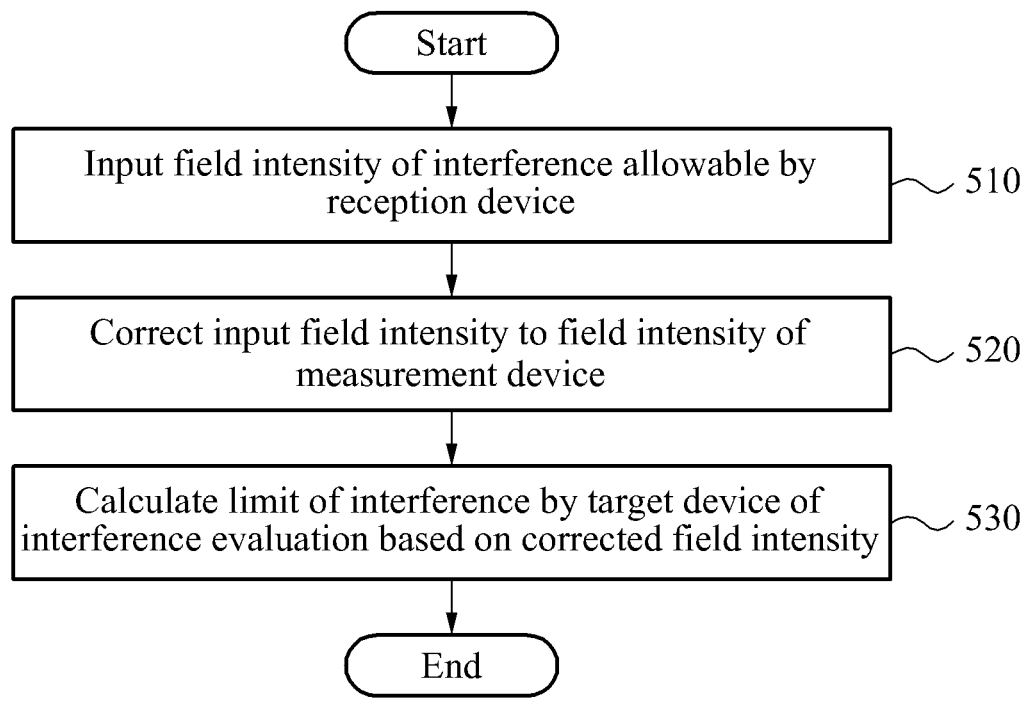
FIG. 5 is a flowchart illustrating a method for calculating a limit according to an exemplary embodiment of the present invention.

FIG. 5 is a flowchart illustrating a method for calculating a limit according to an exemplary embodiment of the present invention. Hereinafter, a process that the limit calculation apparatus calculates a limit for interference evaluation concerning a multi-source noise environment of an EM zone will be described with reference to FIG. 5.

In operation 510, the limit calculation apparatus may receive an input of a field intensity of interference allowable by a device subject to interference due to a target device of interference evaluation. In this case, the limit calculation apparatus corrects the input field intensity to a field intensity of a measurement device to measure an impact of interference by the target device of interference evaluation in operation 520. For example, the limit calculation apparatus may correct a field intensity of the measurement device of Equation 2 in consideration of an attenuation effect based on a distance between the device subject to interference and the measurement device, an attenuation effect of an obstacle, and a polarization state of the measurement antenna, thereby calculating a corrected field intensity as shown in Equation 3. Further, the limit calculation apparatus may correct the field intensity of Equation 3 in consideration of a difference between the device subject to interference and the measurement device concerning an obstacle and a multi-source noise environment of a region defined as the same EM wave environment as illustrated in Equation 4.

In operation 530, the limit calculation apparatus calculates a limit for determining a probability of interference occurring based on the corrected field intensity. Here, the limit calculation apparatus may convert the corrected field intensity of Equation 4 into a log scale of Equation 5, generate an interference evaluation model of Equation 6 concerning a multi-source noise environment of a region defined as the same EM wave environment based on Equation 5, and calculate the limit based on the generated interference evaluation model.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for evaluating statistical interference, the apparatus comprising:
a receiver to receive an electromagnetic (EM) wave in a preset frequency band;
a spectrum analyzer to analyze the received EM wave and to measure interference in the preset frequency band;
a frequency selector to select an interest frequency in the frequency band based on a level of the measured interference;
an amplitude probability distribution (APD) measurement unit to measure an APD of an interference signal with respect to the interest frequency;
a comparator to compare the measured APD to a limit and to determine a probability of a limit of interference or higher occurring; and a limit calculation unit to calculate the limit based on an interference evaluation model in consideration of a multi-source noise environment of a region defined as the same EM wave environment.

2. The apparatus of claim 1, wherein the interest frequency is a peak frequency or a particular frequency of a device subject to interference in the frequency band.

3. The apparatus of claim 1, wherein the limit calculation unit generates the interference evaluation model by correcting a field intensity of interference allowable by a device subject to interference due to a target device of interference evaluation to a field intensity of a measurement device to measure an impact of interference by the target device of interference evaluation and calculates the limit based on the generated interference evaluation model.

4. The apparatus of claim 3, wherein the limit calculation unit generates the interference evaluation model by correcting a difference between the device subject to the interference and the measurement device in consideration of an attenuation effect based on a distance between the device subject to the interference and the measurement device and the multi-source noise environment of the region defined as the same EM wave environment.

5. A device for calculating a limit, the device comprising:
an input unit to receive an input of a field intensity of interference allowable by a device subject to interference due to a target device of interference evaluation;
a correction unit to correct the field intensity to a field intensity of a measurement device to measure an impact of interference by the target device of interference evaluation; and
a calculation unit to calculate a limit for drawing a probability of interference occurring, based on the corrected field intensity.

6. The device of claim 5, wherein the correction unit corrects a difference between the device subject to the interference and the measurement device in consideration of an attenuation effect based on a distance between the device subject to the interference and the measurement device and a multi-source noise environment of a region defined as the same electromagnetic (EM) wave environment.

7. The device of claim 5, wherein the calculation unit generates an interference evaluation model based on the corrected field intensity in consideration of the multi-source noise environment of the region defined as the same EM wave environment and calculates the limit based on the generated interference evaluation model.

8. An apparatus for evaluating statistical interference, the apparatus comprising:
a frequency selector to select an interest frequency in a preset frequency band based on a level of interference measured in the entire preset frequency band;
an amplitude probability distribution (APD) measurement unit to measure an APD of an interference signal with the interest frequency;
a comparator to compare the measured APD to a limit and to determine a probability of the limit of interference or higher occurring; and
a limit calculation unit to detect the limit based on an interference evaluation model in consideration of a multi-source noise environment of a region defined as the same electromagnetic (EM) wave environment.

9. The apparatus of claim 8, wherein the limit calculation unit generates the interference evaluation model by correcting a field intensity of interference allowable by a device subject to interference due to a target device of interference evaluation to a field intensity of a measurement device to measure an impact of interference by the target device of interference evaluation and calculates the limit based on the generated interference evaluation model.

10. A method for evaluating statistical interference carried out by an interference evaluation apparatus in consideration of a multi-source noise environment, the method comprising:
setting a frequency band for interference evaluation;
measuring interference in the set frequency band;
selecting an interest frequency in the frequency band based on a level of the measured interference;
measuring an amplitude probability distribution (APD) of an interference signal with respect to the interest frequency;
comparing the measured APD with a limit and determining a probability of the limit of interference or higher occurring; and
calculating the limit based on an interference evaluation model in consideration of a multi-source noise environment of a region defined as the same EM wave environment.

11. The method of claim 10, further comprising receiving an electromagnetic (EM) wave in the set frequency band using an antenna, subsequent to the setting,
wherein the measuring measures the interference in the set frequency band by analyzing the received EM wave using a spectrum analyzer based on a preset method of measuring EM wave interference.

12. The method of claim 10, wherein the calculating comprises:
generating the interference evaluation model by correcting a field intensity of interference allowable by a device subject to interference due to a target device of interference evaluation to a field intensity of a measurement device to measure an impact of interference by the target device of interference evaluation; and
calculating the limit based on the generated interference evaluation model.

13. The method of claim 12, wherein the generating generates the interference evaluation model by correcting a difference between the device subject to the interference and the measurement device in consideration of an attenuation effect based on a distance between the device subject to the interference and the measurement device and the multi-source noise environment of the region defined as the same EM wave environment.

14. A method for calculating a limit carried out by a limit calculation device for statistical interference evaluation considering a multi-source noise environment, the method comprising:
receiving an input of a field intensity of interference allowable by a device subject to interference due to a target device of interference evaluation;
correcting the field intensity to a field intensity of a measurement device to measure an impact of interference by the target device of interference evaluation; and
calculating a limit for determining a probability of interference occurring, based on the corrected field intensity.

15. The method of claim 14, wherein the correcting corrects a difference between the device subject to the interference and the measurement device in consideration of an attenuation effect based on a distance between the device subject to the interference and the measurement device and a multi-source noise environment of a region defined as the same electromagnetic (EM) wave environment.

16. The method of claim 14, wherein the calculating comprises:

generating an interference evaluation model based on the corrected field intensity in consideration of the multi-source noise environment of the region defined as the same EM wave environment; and calculating the limit based on the generated interference evaluation model.

\* \* \* \* \*